United States Patent [19]

Yamamoto et al.

[11] 4,271,466
[45] Jun. 2, 1981

[54] DIRECT MEMORY ACCESS CONTROL SYSTEM WITH BYTE/WORD CONTROL OF DATA BUS

[75] Inventors: Mitsuru Yamamoto, Kawasaki; Jun Arai, Yokosuka; Takao Isogawa; Isamu Hasebe, both of Yokohama, all of Japan

[73] Assignee: Panafacom Limited

[21] Appl. No.: 962,647

[22] Filed: Nov. 21, 1978

Related U.S. Application Data

[63] Continuation-in-part of Ser. No. 658,854, Feb. 10, 1976, abandoned.

[30] Foreign Application Priority Data

| Feb. 20, 1975 | [JP] | Japan | 50-21242 |
| Feb. 20, 1975 | [JP] | Japan | 50-21243 |
| Feb. 20, 1975 | [JP] | Japan | 50-21244 |
| Feb. 20, 1975 | [JP] | Japan | 50-21245 |

[51] Int. Cl.³ .......................................... G06F 13/00
[52] U.S. Cl. .......................................... 364/200
[58] Field of Search ... 364/200 MS File, 900 MS File

[56] References Cited

U.S. PATENT DOCUMENTS

| B 461,752 | 4/1976 | Delagi et al. | 364/200 |
| 3,462,742 | 8/1969 | Miller et al. | 364/200 |
| 3,500,329 | 3/1970 | Couleur et al. | 364/200 |
| 3,544,966 | 12/1970 | Harmon | 364/200 |
| 3,560,937 | 2/1971 | Fischer | 364/200 |
| 3,582,903 | 6/1971 | Verdier | 364/200 |
| 3,740,722 | 6/1973 | Greenberg et al. | 364/200 |
| 3,766,526 | 10/1973 | Buchanan | 364/200 |
| 3,793,631 | 2/1974 | Silverstein et al. | 364/200 |
| 3,810,114 | 5/1974 | Yamada et al. | 364/200 |
| 3,828,325 | 8/1974 | Stafford et al. | 364/200 |
| 3,909,790 | 9/1975 | Shapiro et al. | 364/200 |
| 3,949,375 | 4/1976 | Ciarlo | 364/200 |
| 3,999,163 | 12/1976 | Levy et al. | 364/200 |
| 4,017,839 | 4/1977 | Calle et al. | 364/200 |
| 4,047,158 | 9/1977 | Jennings | 364/900 |
| 4,047,201 | 9/1977 | Kerllenevich | 364/200 |
| 4,057,846 | 11/1977 | Cockerill et al. | 364/200 |
| 4,067,059 | 1/1978 | Derchak | 364/200 |
| 4,075,691 | 2/1978 | Davis et al. | 364/200 |
| 4,090,238 | 5/1978 | Russo | 364/200 |
| 4,122,520 | 10/1978 | Adamchick et al. | 364/200 |

*Primary Examiner*—Melvin B. Chapnick
*Attorney, Agent, or Firm*—Staas & Halsey

[57] ABSTRACT

A direct memory access control (DMAC) system, in a data processing system, includes at least a central processing unit and a memory, the memory being capable of storing and providing data in any one of several predetermined formats. A plurality of input/output control ports, each connecting a respective input/output device to a common data bus, control data transfer in either direction between the device and the memory. A direct memory access control unit is connected to the common data bus for receiving an access request signal from any of the plurality of input/output control ports, and is connected to the memory for providing thereto, in response to the access request signal, instructions at least as to the size and desired format of the data transfer. A bus switching unit connects the common data bus to the memory, and is connected to the direct memory access control unit for receiving the instructions. The bus switching unit is responsive to the direct memory access control unit for interfacing the memory to the common data bus in such a manner as to cause the data transfer to be of the desired format.

21 Claims, 19 Drawing Figures

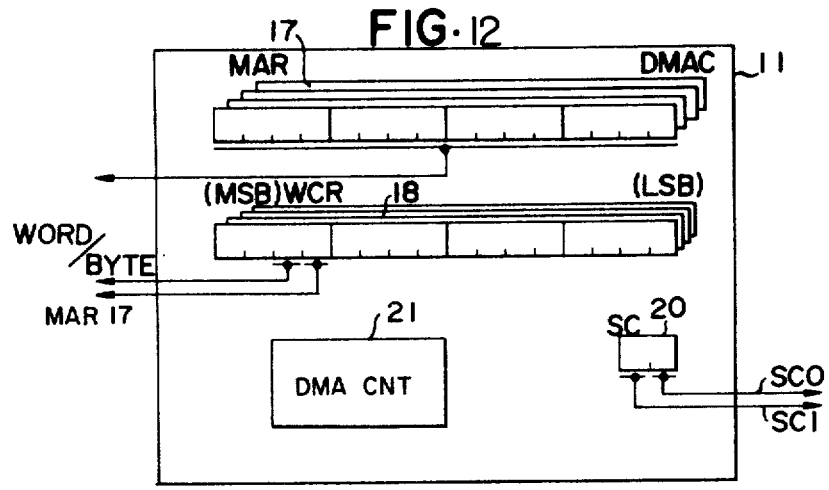
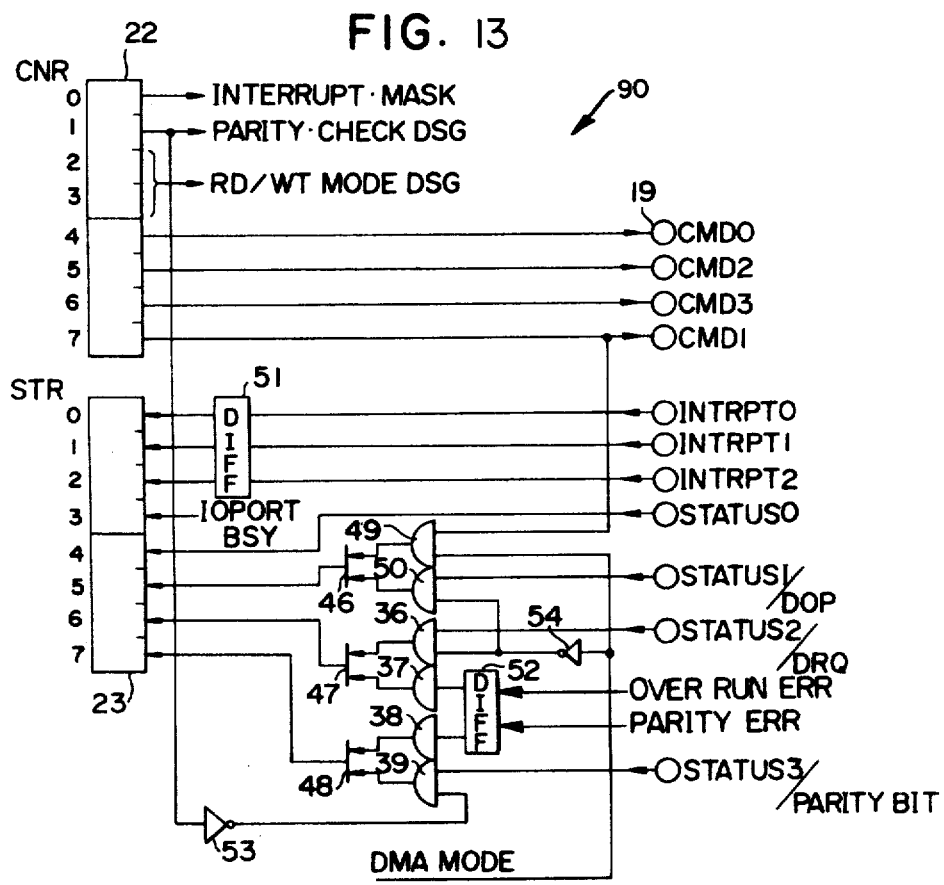

DIRECT MEMORY ACCESS CONTROL SYSTEM WITH BYTE/WORD CONTROL OF DATA BUS

CROSS REFERENCE TO RELATED APPLICATION

This application is a continuation in part of our copending Application Ser. No. 658,854 filed Feb. 18, 1976, now abandoned.

BACKGROUND OF THE INVENTION

1. Field of the Invention

This invention relates to a direct memory access control system with byte/word control of a data bus, and more particularly to a direct memory access control system for a data processor having a central processing unit part, input/output control ports and a memory respectively connected to the data bus and permitting direct access of the input/output control ports to the memory, in which a direct memory access control unit is provided for the management of the direct memory access and a byte-unit transfer can be controlled.

2. Description of the Prior Art

In ordinary one-chip computers, use is rarely made of only a CPU chip, but they are used in combination with peripheral device chips. Accordingly, one or more input/output control port chips, memory chips, etc. are usually connected to a data bus in association with the CPU chip. The input/output control ports used are classified into those having a function of direct memory access (hereinafter referred to as DMA) and those having no such function. Further, they are divided into those having a bus width of one byte between them and the input/output devices, and those having a bus width of one word, that is, two bytes. In this case, it is inadvisable to form the input/output control ports with chips of different constructions respectively corresponding to required functions. It is desired to form the input/output control ports with chips of the same construction.

In such a case, when data is transferred between the input/output control port and the input/output device, the former usually produces a control signal for guaranteeing the data transferred, and it is necessary to change the pulse width of the control signal in accordance with the kind of input/output device and the distance thereto.

Further, each part is required to send and receive several kinds of control signals so as to have various functions but there arises a problem in that a large number of input/output terminal pins cannot be provided on an LSI chip. Moreover, the data sending and receiving operation of the input/output control port has a plurality of modes and it is necessary to comply with this.

SUMMARY OF THE INVENTION

One object of this invention is to provide a direct memory access control system for a data processor having a CPU chip, a memory and a plurality of input/output control ports respectively connected to a common data bus, in which system the input/output control ports are all formed with chips of the same pattern regardless of whether or not they have a direct memory access function.

Another object of this invention is to provide a direct memory access control system for a data processor in which system, in the case of a bus width of either one byte or one word being provided between an input/output control port and an input/output device connected thereto, when the input/output control port accesses a memory to transfer data, the DMA control is achieved by a DMA control unit which designates either a word-unit data transfer or a byte-unit data transfer. In the first case, both the upper and lower bytes are fully accessed at the same time, while, in the second case, either one of upper and lower bytes can be freely accessed.

Another object of this invention is to provide a direct memory access control system for a data processor in which, in order to ensure reception of a control signal even when the distance between an input/output control port and an input/output device is large, in order to increase the data width when the abovesaid distance is short, and in order to use the same control signal regardless of the kind of the input/output device, the control signal is continuously generated in the data sending and receiving mode of operation and is reset by a response signal from the input/output device, thereby to provide universality in the construction of the input/output control port.

Another object of this invention is to provide a direct memory access control system for a data processor which decreases that number of input/output terminal pins, on a DMA control unit chip, which are used when the DMA control unit receives DMA request signals from a plurality of input/output control ports and sends DMA operation approval signals based on the DMA control signals.

Still another object of this invention is to provide universal one-chip input/output control ports to enable substantial reduction of the cost of data processing systems.

Briefly stated, according to this invention, in a data processor in which at least a central processing unit part, one or more input/output control ports and a memory capable of word or byte designation are connected to a data bus and the one or more input/output control ports are directly accessible to the memory, a bus switching unit is provided between the memory and the data bus, and a direct memory access control unit is connected to the data bus. The direct memory access control unit supplies the memory with a word/byte designating signal and a signal designating the byte position at the time of byte designation, thereby selectively controlling upper byte information and lower byte information in one word at the time of byte designation.

BRIEF DESCRIPTION OF THE DRAWINGS

FIG. 9 is a general block diagram of the input/output port 3-10 of the system;

FIG. 12 is a diagram showing the outline of the direct memory access control unit of FIG. 4;

FIG. 13 is a diagram illustrating the construction of one part of the input/output control port.

DESCRIPTION OF THE PREFERRED EMBODIMENTS

Figure 1:
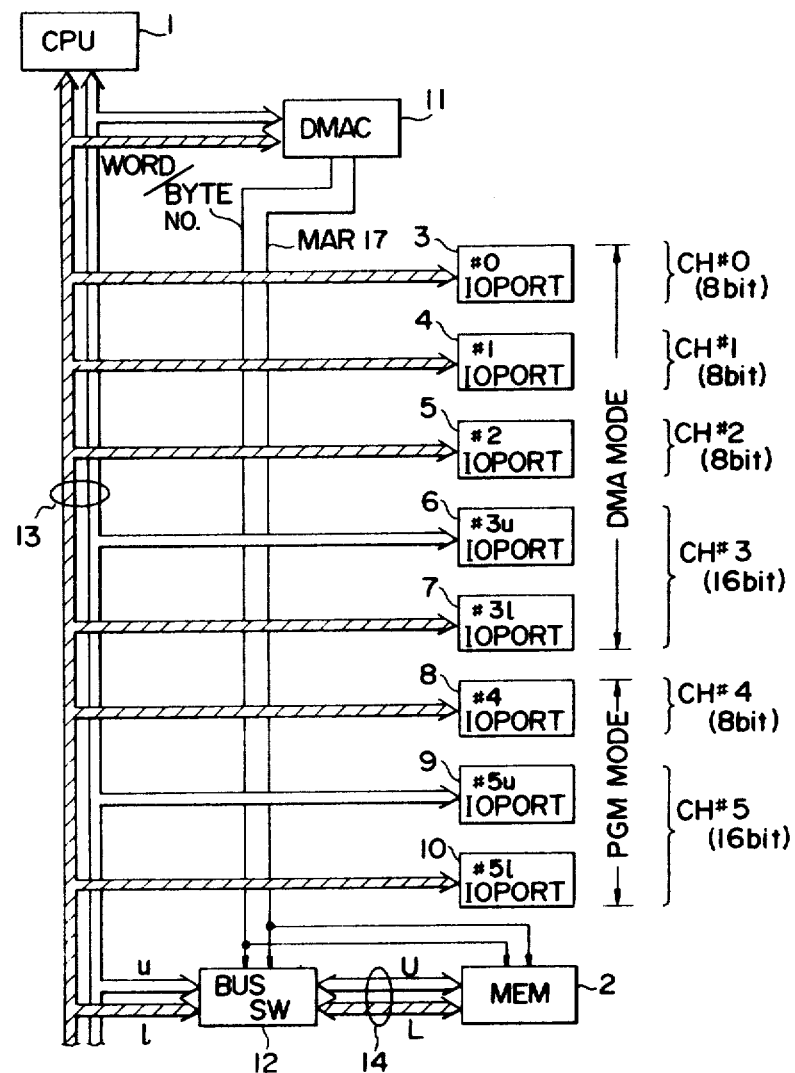
FIG. 1 is a diagram showing the general construction of one example of the direct memory access control system of this invention.

In FIG. 1, reference numeral 1 indicates a central processing unit (a CPU chip); 2 designates a memory; 3 to 7 identify input/output control ports requiring the DMA control function; 8 to 10 denote input/output control ports (actuable in a program mode of operation) serving as slave devices only; 11 represents a direct memory access control (DMAC) unit, which achieves DMA control on request from the input/output control ports 3 to 7; 12 shows a bus switching unit; 13 refers to a data bus line; and 14 indicates a memory bus.

The input/output control ports 3 to 10 are respectively connected to input/output devices not shown, and each serves to control a data transfer between each input/output device and the memory 2. The input/output control ports 3 to 10 are identical, in construction, to one another, and are adapted to effect a data transfer, for example, in an 8-bit unit (one byte unit). The #0 input/output control port 3 forms a channel #0; the #1 input/output control port 4 forms a channel #1; the #2 input/output control port 5 forms a channel #2; the #3u and #3l input/output control ports 6 and 7, in combination, form a channel #3 of a 2-byte bus width; the #4 input/output control port 8 forms a channel #4; and #5u and #5l input/output control ports 9 and 10 form, in combination, a channel #5 of a 2-byte bus width. The channels #0 to #3 are designed so as to be directly accessible to the memory 2 under the control of the DMA control unit 11.

In the case of a word-unit transfer, the bus switching unit 12 is designed so that upper and lower byte lines U and L of the memory bus 14 are respectively connected to upper and lower byte lines u and l of the data bus 13. In the case of a byte-unit transfer, the bus switching unit 12 is adapted to switchably connect the upper and lower byte lines U and L of the memory bus 14 to the data bus 1.

In the case of the DMA control unit 11 accessing the memory 2, there are the word-unit and the byte-unit data transfers as mentioned above and, for the control of these transfers, it is necessary that the DMA control unit 11 apply instructions to the bus switching unit 12 and the memory 2.

Figure 2:
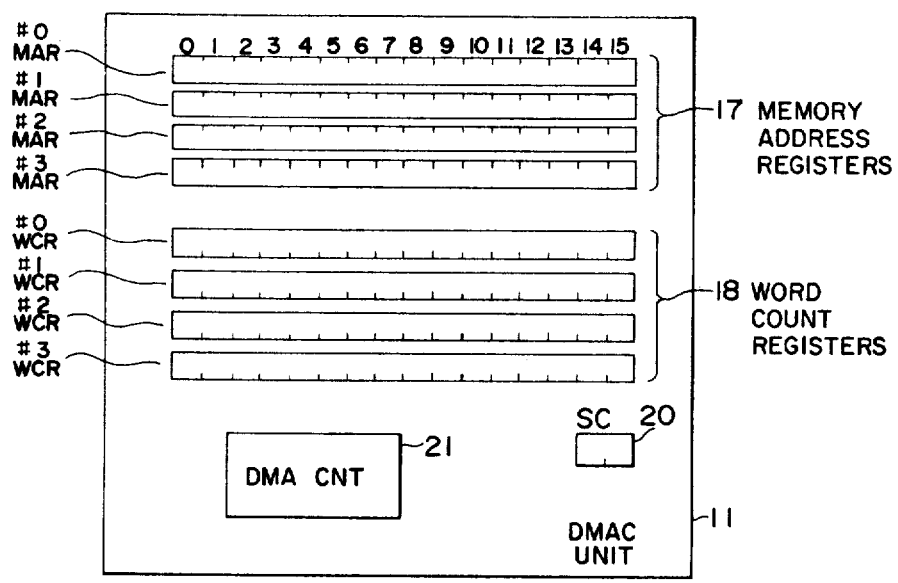
FIG. 2 is a diagram showing the outline of the direct memory access control unit of FIG. 1.
Figure 3:
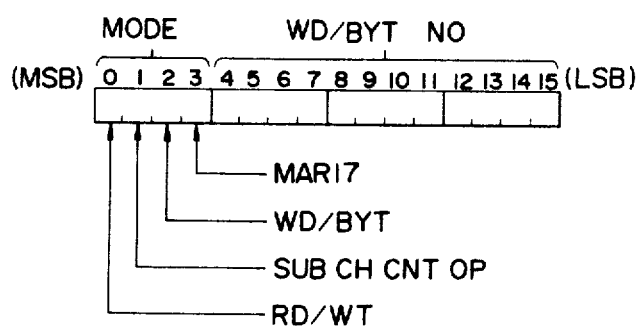
FIG. 3 shows a bit configuration of a word count register in FIG. 2.

FIG. 2 shows an outline of the DMA control unit 11 for the abovesaid control, while FIG. 3 is a diagram depicting the contents of the word count registers 18 of the DMAC unit 11. The control unit 11 is composed of memory address registers 17 (#0 MAR to #3 MAR) respectively corresponding to the channels #0 to #3, word count registers 18 (#0 WCR to #3 WCR), a sub-channel counter (SC) 20 for retrieving a DMA control request from each channel, and a DMA control part (DMA CNT) 21.

The memory address registers 17 comprise registers for storing address information for the memory 2, which registers comprise, for example, 16 bits and, thus, designation of up to 65K addresses is possible. The word count registers (WCR) 18 each correspond to one channel, are provided for the designation of both the mode of access and the transfer word/byte number, and comprise 16 bits. As shown in FIG. 3, four upper bits make up a mode designating part (MODE) and the remaining 12 bits form a word/byte number designating part (WD/BYT NO). The sub-channel counter (SC) 20 is a counter whose content is normally periodically renewed in the order of "00", "01", "10", "11", "00", ... corresponding to the channels #0 to #3. The counter 20 is designed so that, for example, when its content is "00", a DMA request signal from the channel #0 is retrieved, and so that, when its content is "01", a DMA request signal from the channel #1 is retrieved. The counter 20 is further designed so that, when the DMA request from the channel #0 is received, the content of the counter 20 is held at "00" as will be described later on, and so that, upon completion of the DMA processing, the periodic renewal of the sub-counter takes place and the retrieval cycle is started again.

The functions of the DMA control unit 11 (FIG. 2) will hereinafter be described, together with the meaning of each bit configuration (FIG. 3) of each word count register 18.

(1) Read/write designating part (RD/WT)

During the DMA control, this bit designates a transfer of data from the memory to an input/output device (thus, to read the memory) or a transfer in the opposite direction (and thus, to write the data in the memory).

(2) Sub-channel counter operation instructing part (SUB CH CNT OP)

When this bit is "0" in all of the word count registers #0 WCR to #3 WCR, the sub-channel counter 20 designates the channel in the order 0-1-2-3-0..., and the DMA control unit 11 examines the presence or absence of the DMA control request in connection with the designated channel. If the request is found, the DMA control unit 11 controls a 1-word (or 1-byte) data transfer, and then passes to the control of the next channel designated by the sub-channel counter 20.

When a certain channel is controlled based on the instruction of the sub-channel counter 20, and if the sub-channel counter operation instructing part of the word count register of that channel is "1", the instruction of the sub-channel counter 20 does not change until this bit becomes "0". Accordingly, as long as the DMA control request from this channel exists, a plural-word (or plural-byte) data transfer is achieved. In this case, the transfer speed is four times as high as that in the abovesaid case.

(3) Word/byte number designating part (WD/BYT)

As described above, the word-unit transfer and the byte-unit transfer exist as possibilities in the DMA control, and this bit selectively designates one of them.

(4) Memory address register designating part (MAR 17)

When the direct memory access (DMA) by byte transfer is designated, this bit designates the position of the byte to be transferred in one word, that is, which of the upper and lower byte sides is transferred. At every byte transfer, the bit content of the memory address register designating part is inverted but, every other time, the quantity 1 is added to the memory address register 17. In a 2-byte per word computer, the address information for the memory access during byte transfer becomes "a lower byte of an address #N", "an upper byte of the address #N", "a lower byte of an address #N+1", "an upper byte of the address #N+L", . . . together with the content of the memory address register 17 and the memory address register designating part MAR 17. However, it is to be understood that, in a 4-byte per word computer, the memory address register designating part would require two bits.

(5) Word/byte number designating part (WD/BYT NO)

This part is composed of the twelve lower bits of the word count register 18, and designates the number of words to be transferred up to a maximum of 4096 words or 4096 bytes. At every transfer of one word or one byte by the word-unit transfer or byte-unit transfer, the quantity 1 is subtracted from the content of this designating part. When this operation is continued so as to result in the condition that the bits are all zero, completion of the transfer by the DMA control is indicated, and this information is applied to the channel which made the DMA request.

The DMA control unit 11 is adapted to receive the request for DMA based on the contents of the word count register and the sub-channel counter, and to transfer data based on DMA as described above. However, it is necessary in order to execute the transfer to give instructions to the memory 2 and the bus switching unit 12 as to whether the transfer is to be the word-unit type or the byte-unit type and, in the case of the byte-unit transfer, to give instructions as to whether the upper byte side or lower byte side is to be transferred. To this end, as shown in FIG. 1, the DMA control unit 11 is designed to supply the memory 2 and the bus switching unit 12 with the contents of the "word/byte number designating part (WD/BYT NO)" and the "memory address register designating part (MAR 17)" in the word count register 18. It is also necessary to inform the memory 2 of the contents of the memory address register 17 and the "read/write designating part (RD/WT)" but these contents are supplied through the data bus 13 as in the case where the central processing unit 1 accesses.

In the case of the word-unit transfer, an address designated by the content of the memory address register 17 is accessed and information is written into or read from the memory 2 at this designated address. In this case, the bus switching unit 12 interconnects the buses in the following manner: u⇌U and l⇌U. On the other hand, in the case of the byte-unit transfer, the memory 2 is accessed based on the contents of the memory address register 17 and the memory address register designating part MAR 17. Thus, when the content of the memory address register designating part MAR 17 is "0", the lower byte side at the address designated by the memory address register 17 is accessed and, in the bus switching unit 12, the buses l and L are interconnected. When the content of the memory address register MAR 17 is "1", the upper byte side at the address designated by the memory address register 17 is accessed and, in the bus switching unit 12, the buses l and U are interconnected.

As has been described above, according to this invention, by achieving DMA control with the DMA control unit 11, the input/output control ports 3 to 10 can be formed with the same construction. The DMA control unit 11 is required only to inform the memory 2 of the contents of the word/byte number designating part (WD/BYT NO) and the memory address register designating part MAR 17.

Next, a description will be given of a direct memory access control system which is provided with one-chip input/output control ports which are of the same construction regardless of the pulse width of a data sending and receiving control signal, and which are distinguished from the kind of input/output control port which must change with the kind of input/output device used and the distance thereto.

Figure 4:
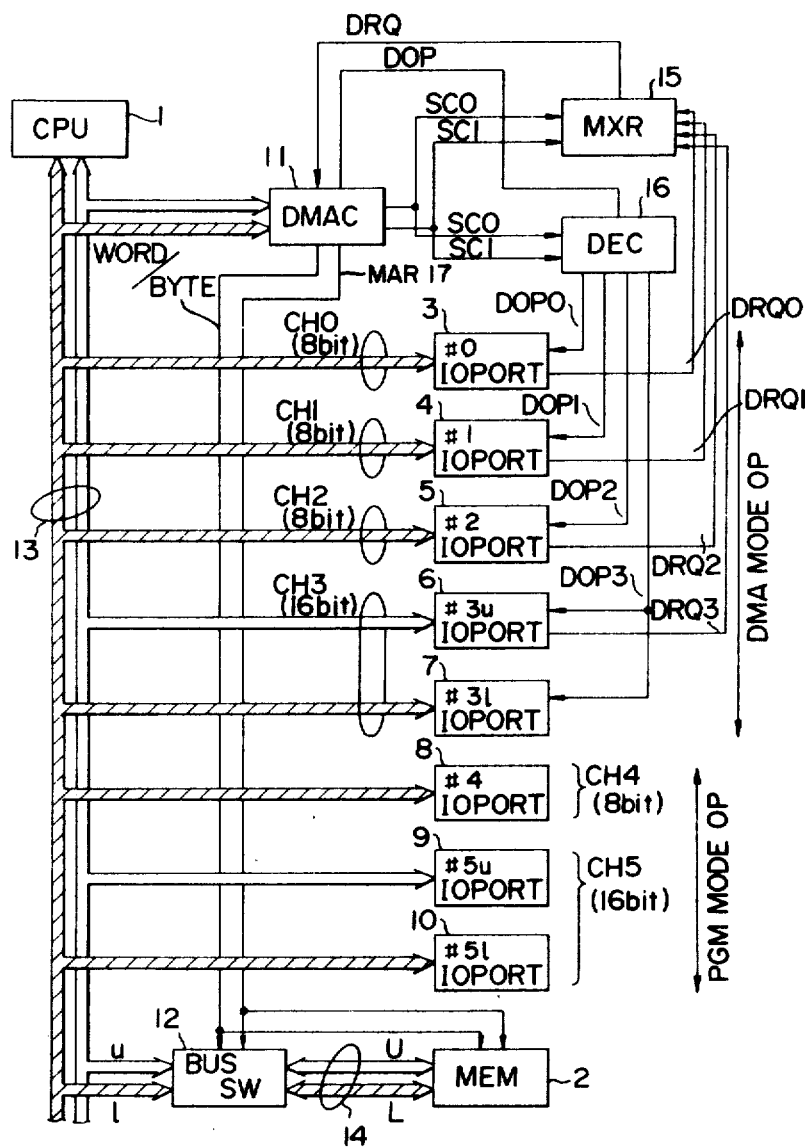
FIG. 4 is a diagram illustrating in detail an example of the direct memory access control system of the invention.

FIG. 4 is a diagram illustrating in detail an example of the direct memory access control system of the invention. In FIG. 4, parts corresponding to those in FIG. 1 are identified by the same reference numerals and characters. Reference numeral 15 indicates a multiplexer, which selectively extracts DMA request signals from the input/output control ports in accordance with the contents of SC0 and SC1 of a sub-channel counter not shown in FIG. 4 but contained within DMA control unit 11, as previously described; and 16 designates a decoder, which decodes the abovesaid contents SC0 and SC1 to distribute DMA operation approval signals to the input/output control ports corresponding thereto.

The input/output control ports 3 to 10 are connected to respective input/output devices not shown, and each controls the data transfer between a respective input/output device and the memory 2. The input/output control ports 3 to 10 are identical in construction, and are each designed to effect, for example, a data transfer of an 8-bit unit. The #0 input/output control port 3 forms a channel #0; the #1 input/output control port 4 forms a channel #1; the #2 input/output control port 5 forms a channel #2; the #3u and #3l input/output control ports 6 and 7, in combination, form a channel #3 of a 16-bit data width; the #4 input/output control port 8 forms a channel #4; and the #5u and #5l input/output control ports form, in combination, a channel #5 of a 16-bit data width. The channels #0 to #3 are adapted to be directly accessible to the memory 2 under the management of the DMA control unit 11.

The bus switching unit 12 has the function of switching the correspondence of the upper and lower byte lines u and l of the data bus 13 with the upper and lower byte lines U and L of the memory bus 14.

In the data processing system of such a construction as described above, in order that the input/output control ports 3 to 10 have universality of application so as to decrease the number of kinds of IC chips used, it is necessary to prepare such a construction as is correctly applicable to various data sending and receiving modes, regardless of the format of the data to be sent and received, the various modes of operation for writing data in the input/output device side from the side of the data bus 13 and for reading out the data from the former to the latter, etc.

Figure 5:
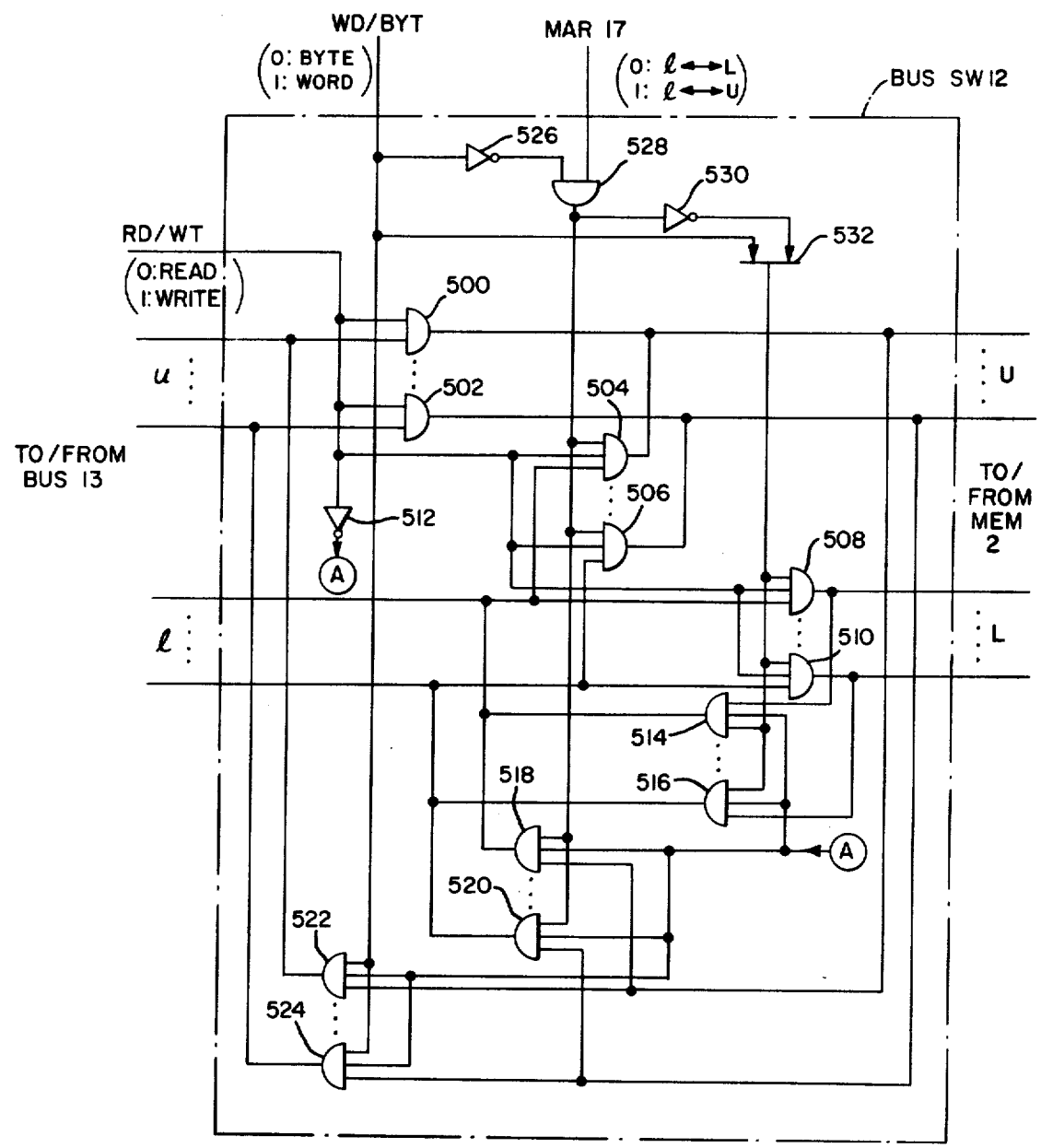
FIG. 5 is a detailed logic diagram of the bus switching unit 12 of the system.

FIG. 5 is a detailed logic diagram of the bus switching unit 12 of the system. The bus switching unit 12 achieves selective transfer of inputs u and l to/from bus 13 from/to memory bus lines U and L leading to the memory 2. The bus switching unit 12 comprises AND gates 500, 502, 504, 506, 508 and 510 utilized during write (to memory) operations as well as AND gates 514, 516, 518, 520, 522 and 524 utilized for read (from memory) operations. In addition, the switching unit 12 includes NOT circuits 512, 526 and 530, AND gate 528, and OR gate 532—this circuitry being employed as control circuitry responsive to the various control signals, RD/WT (for indicating read or write operations), WD/BYT (for indicating byte or word transfer), and MAR 17 (for indicating, in the byte transfer mode, transfer between the lines l and L, and l and U, respectively).

In operation, when control signal RD/WT has a value of 1, AND gates 500, 502, 504, 506, 508 and 510 are enabled for writing to memory 2, and—via NOT circuit 512—AND gates 514, 516, 518, 520, 522 and 524 are disabled to preclude reading from memory 2. Similarly, when RD/WT has a value of 0, AND gates 500, 502, 504, 506, 508 and 510 are disabled, and AND gates 514, 516, 518, 520, 522 and 524 are enabled for reading from memory 2.

When control signal WD/BYT has the value 1—indicating a word transfer operation—gates 508 and 510 are enabled in the case of a write to memory operation, while gates 514 and 516 are enabled for a read operation, data transfer taking place between lines l and L. On the other hand, when WD/BYT has a value of 0, indicating byte transfer, a value of 1 is applied to one input of AND gate 528, the other input of which receives MAR 17. When MAR 17 has a value of 1, indicating transfer between l and U, gates 504 and 506 are enabled in the case of a write operation, and gates 518 and 520 are enabled in the case of a read operation. On the other hand, when MAR 17 has a value of 0, AND gate 528 provides a 0 output which disables gates 504, 506, 518 and 520, but which—via NOT circuit 530 and OR gate 532—enables gates 508 and 510 for a write operation, and enables gates 514 and 516 for a read operation. Thus, data transfer is effected between lines l and L in correspondence to MAR 17 taking on a 0 value.

It is to be noted that, in the byte transfer mode, MAR 17 is utilized to designate the upper or lower byte of the word designated by the content of the memory address register 17 in DMAC 11. With every transfer of a byte, the bit content of MAR 17 in word count registers 18 (FIGS. 2 and 3) is inverted such that transfer between l and L, and l and U, respectively, is alternately achieved. During alternate inversions (for example, on every inversion of MAR 17 from 1 to 0), a +1 is added to the contents of the memory address registers 17 so as to designate the next word, in memory, from which or to which upper and lower bytes are to be transferred.

Figure 6:
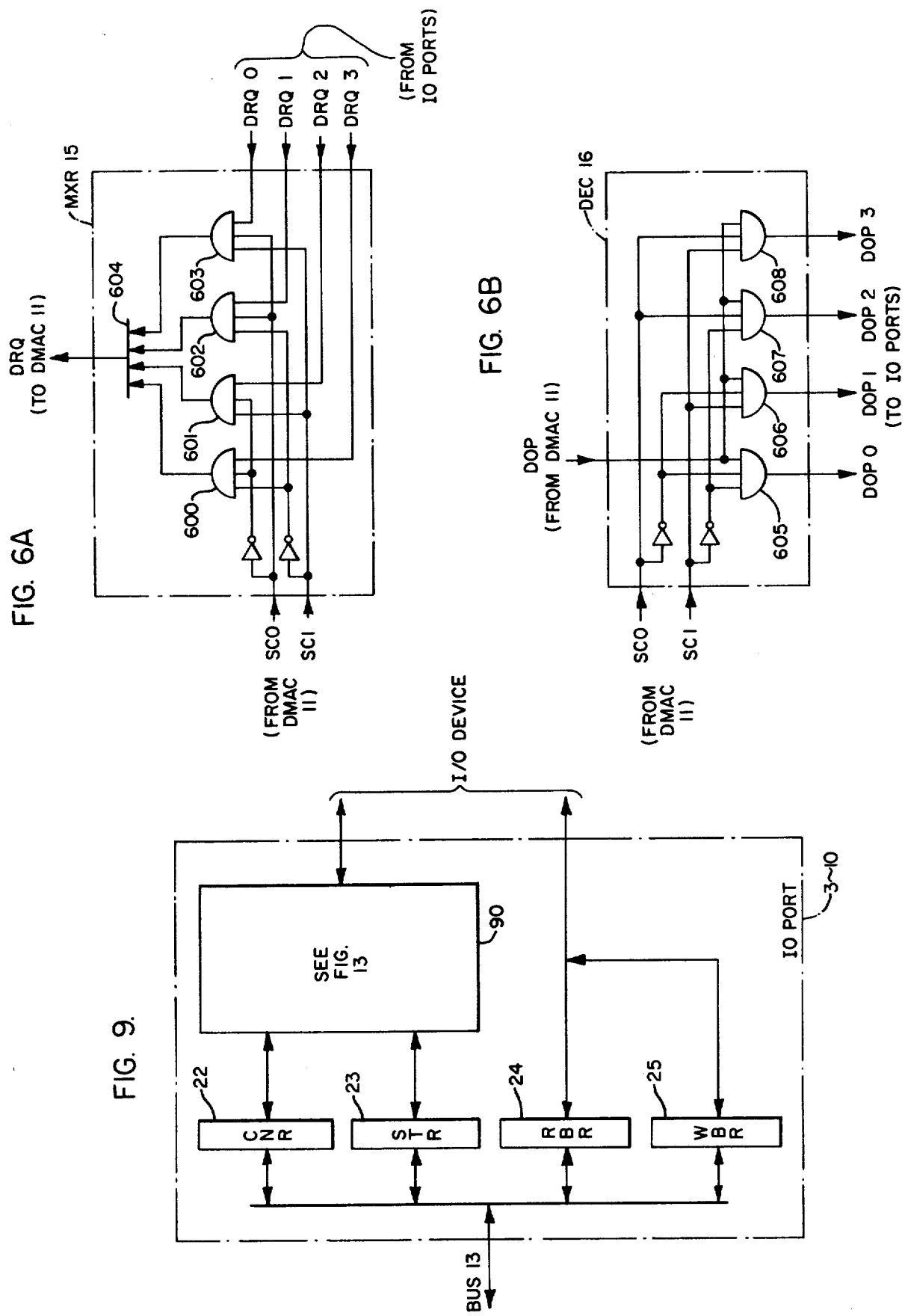
FIG. 6A is a detailed logic diagram of the multiplexer 15 of the system.
FIG. 6B is a detailed logic diagram of the decoder 16 of the system.

FIG. 6A is a detailed logic block diagram of the multiplexer MXR 15 of the system. MXR 15 performs the function of extracting DMA request signals selectively from IOPORTS in accordance with the control signal inputs SC0 and SC1 from the sub-channel counter 20 (FIG. 2). Specifically, respective values of 00, 01, 10 and 11 on input lines SC0 and SC1 successively enable AND gates 600, 601, 602 and 603 so as to successively provide DMA request signals DRQ3, DRQ2, DRQ1 and DRQ0 from the IOPORTS, via OR gate 604, as output DRQ (of MXR 15) to DMAC unit 11.

FIG. 6B is a detailed logic block diagram of the decoder circuit DEC 16. Decoder 16 decodes the input control signals SC0 and SC1 from the sub-channel counter 20 in order to distribute DMA operation approval signals (designated DOP) to the various IOPORTS. In operation, which is quite similar to the operation of MXR 15 described above, successive values of SC0 and SC1 successively enable AND gates 605–608 so as to provide input DOP (operation approval signals), as outputs DOP0 through DOP3, to the IOPORTS.

Figure 7:
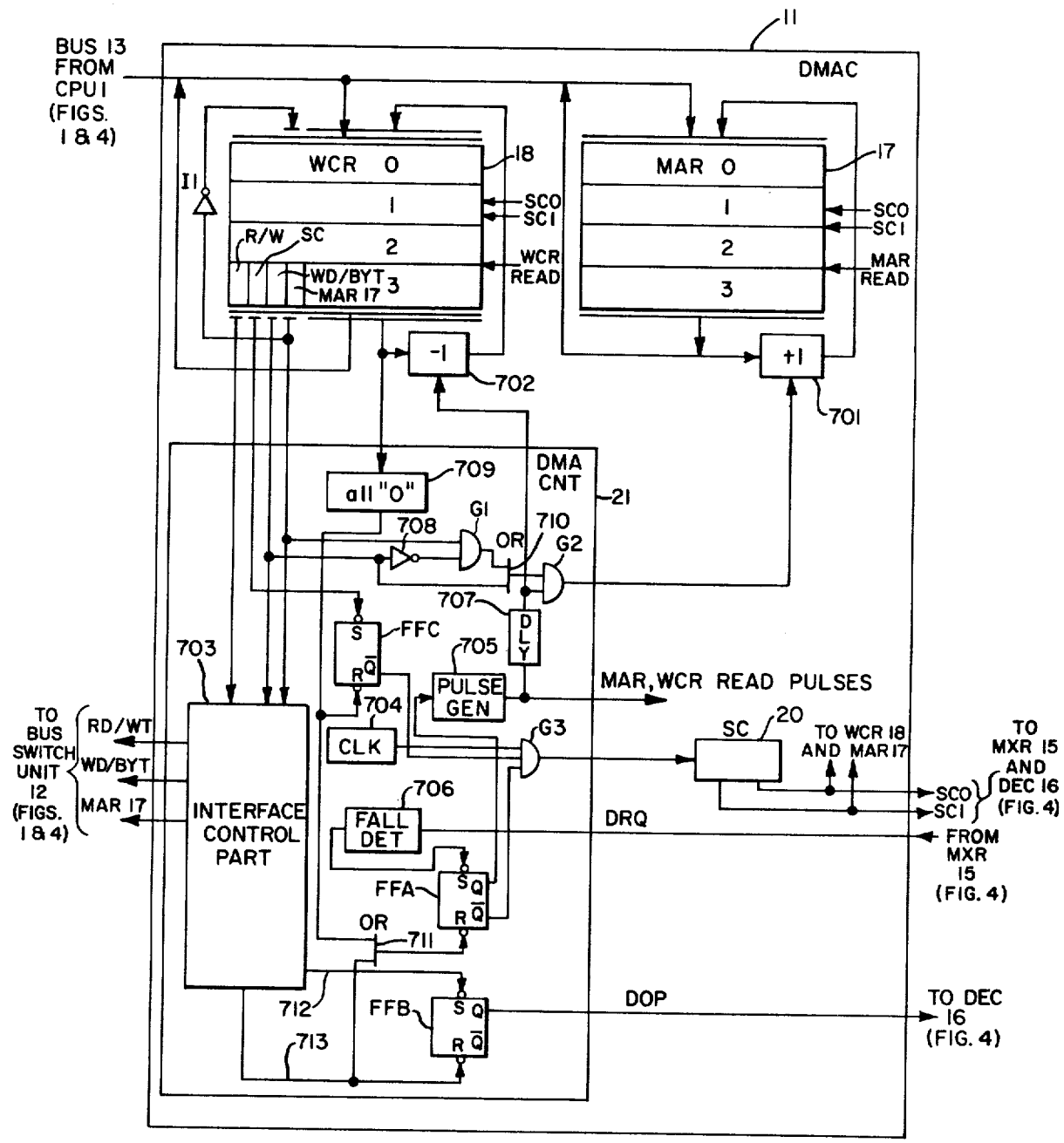
FIG. 7 is a detailed logic diagram of the direct memory access control 11 of the system.

FIG. 7 is a detailed logic block diagram of the DMAC unit 11. As previously described, referring to FIG. 2, DMAC 11 comprises memory address registers 17, word count registers 18, sub-channel counter 20, and DMA control (DMA CNT) 21. In DMAC 11, "add 1" circuit 701 and "subtract 1" circuit 702 are associated with MAR 17 and WCR 18, respectively. DMA control 21 (in DMAC 11) includes interface control part 703, clock generator 704, pulse generator 705, fall detection circuit 706, delay 707, inverter 708, "all 0" detection circuit 709, OR gates 710 and 711, various AND gates G1, G2 and G3, and various flip-flop circuits FFA, FFB and FFC.

The operation of DMAC 11 is as follows. Each time the content of WCR 18 is read out, the last 12 bits thereof (WD/BYT NO which designates the number of words/bytes to be read out) are provided to "subtract 1" circuit 702 which achieves a downcounting operation. At the same time, bit 3 (MAR 17) is inverted by the inverter I1. In this manner, the contents of WCR 18 are recirculated. However, if—on readout of the contents of WCR 18—the bit content of MAR 17 is "1", and if the word/byte designating bit (WD/BYT) is "0" designating byte transfer, this particular condition is detected by AND gate G1 which, via OR gate 710 and AND gate G2, activates "add 1" circuit 701 so as to add 1 to the contents of MAR 17 which are also recirculated. Thus, as previously mentioned, whereas the bit content of MAR 17 is successively inverted by inverter I1, a +1 is added to the contents of MAR 17 during each alternate inversion of MAR 17, thus designating the next word in memory from/to which bytes are to be transferred.

The operation of DMAC 11, and DMA CNT 21 in particular, is as follows:

(1) Initially, flip-flops FFA, FFB and FFC are all in their reset states. Accordingly, clock pulses generated by clock pulse generator 704 are provided, via AND gate G3 which is enabled by the Q outputs of flip-flops FFA and FFC, to the sub-channel counter 20, which cyclically advances step-by-step. At this point, it should be noted that WRC 18 and MAR 17 are not read out unless a DRQ signal is received from MXR 15 (FIG. 4).

(2) When a DRQ signal is provided to DMAC 11, such is detected by the fall detector circuit 706 of DMA CNT 21, and flip-flop FFA is set. If, at this juncture, sub-channel counter 20 indicates "01" (for example), a DMA request from IOPORT #1 (FIG. 4) is indicated. It is to be noted that, when flip-flip FFA is set, the Q output thereof acts as a disabling input to AND gate G3, thus inhibiting the provision of clock pulses from clock generator 704 to the sub-channel counter 20.

(3) Correspondingly, the rise of the Q output of flip-flop FFA is detected by pulse generator circuit 705, which produces MAR and WCR READ pulses, which in turn are provided to MAR 17 and WCR 18 for reading the contents thereof. The particular MAR 17 (MAR0, MAR1, etc.) and the particular WCR 18 (WCR0, WCR1, etc.) to be read out depend on the value of the sub-channel counter 20 outputs SC0 and SC1. The READ pulses provided by pulse generator 705 are also provided, via delay circuit 707, to the "subtract 1" circuit 702 to actuate same so as to successively subtract 1 from the last 12 bits of the contents of WCR 18 each time those contents are read out and recirculated. In addition, as will be explained below, under certain conditions, the READ pulses are provided, on a delayed basis, via AND gate G2, to the "add 1" circuitry 701 so as to add the value 1 to the contents read out from MAR 17 and restored therein.

(4) With each readout operation, the contents of MAR 17 (that is, the specifically designated MAR0, MAR1, etc.) are provided as an input to the address bus of bus 13, while the high-order (4) bits of the contents of WRC 18 are provided to DMA CNT 21. Specifically, R/W, WD/BYT and MAR 17 are provided to interface control part 703 which secures the right of use of bus 13. Details of control of a common bus are obvious to one of ordinary skill in the art, as exemplified by the disclosure of U.S. Pat. No. 3,710,324, the contents of which are hereby incorporated by reference.

(5) As mentioned earlier, the pulse output of pulse generator 705 is, after delay in delay circuit 707, provided to "subtract 1" circuit 702, and under certain conditions to "add 1" circuit 701. The actuation of "add 1" circuit 701 takes place only under one of the following conditions:

(a) when WD/BYT is "1"—indicating a word transfer operation—thus, calling for the addition of 1 to the contents of the MAR 17 each time a transfer takes place.

(b) when WD/BYT is "0" (indicating byte transfer) and MAR 17 is "1"—as detected by AND gate G1—indicating the occurrence of that alternate inversion cycle (inverter I1) during which a "subtract 1" operation is to take place with respect to the recirculated contents of WRC 18 (as previously discussed above).

(6) Once interface control part 703 establishes an interface between it and the memory 2 (FIGS. 1 and 4), flip-flop FFB is set via line 712, and the Q output thereof constitutes a DOP signal to the particular IOPORT designated by sub-channel counter 20. The signal DOP constitutes a command for the particular IOPORT to send data on bus 13 (in the case of a write to memory operation) or to read in data from bus 13 (in the case of a read to memory operation). Upon receipt of the DOP signal, the particular IOPORT achieves one of the above (write or read) operations, and then "drops" the DRQ signal, such "drop" being detected by fall detector circuit 706.

(7) Interface control part 703 contains internal timing circuitry (not shown) which, via output line 713, resets flip-flop FFA (via OR gate 711) and flip-flop FFB a certain period of time after the original setting of flip-flop FFB, or when a completion signal has been received from memory.

(8) Flip-flop FFC remains in its reset state until set by a "1" output from the sub-channel counter operation designating bit SC from WCR 18. So long as flip-flop FFC remains in its reset state, the resetting of flip-flop FFA results in the opening of gate G3 so that clock pulses from clock pulse generator 704 are provided to sub-channel counter 20, thus resuming the step-by-step operation of sub-channel counter 20, and control is returned to the beginning of the series of steps beginning with step (1) above. Then, when a particular IOPORT makes a DMA request, the operations described in steps (2)–(7) above are repeated.

(9) However, when the sub-channel counter operation designating bit SC becomes "1," flip-flop FFC is set. Accordingly, even when (as discussed in step (7) above) flip-flop FFA is reset, gate G3 is not opened, and the counter 20 does not receive pulses from clock pulse generator 704 so as to perform its step-by-step operation. At this time, if a particular IOPORT makes the DMA request again, the operation of steps (2)–(7) are repeated again in connection with the particular IOPORT.

(10) Each time the operations of steps (2)–(7) are repeated, the contents of WRC 18—that is, the last 12 bits thereof—are down-counted by 1 in "subtract 1" circuit 702. When the last 12 bits of WCR 18 become 0, this condition is detected by the all "0" detector 709 which produces a pulse to reset flip-flops FFA and FFC (the latter via OR gate 711). As a consequence, gate G3 is opened, and the step-by-step operation of SC counter 20 is resumed.

Figure 8:
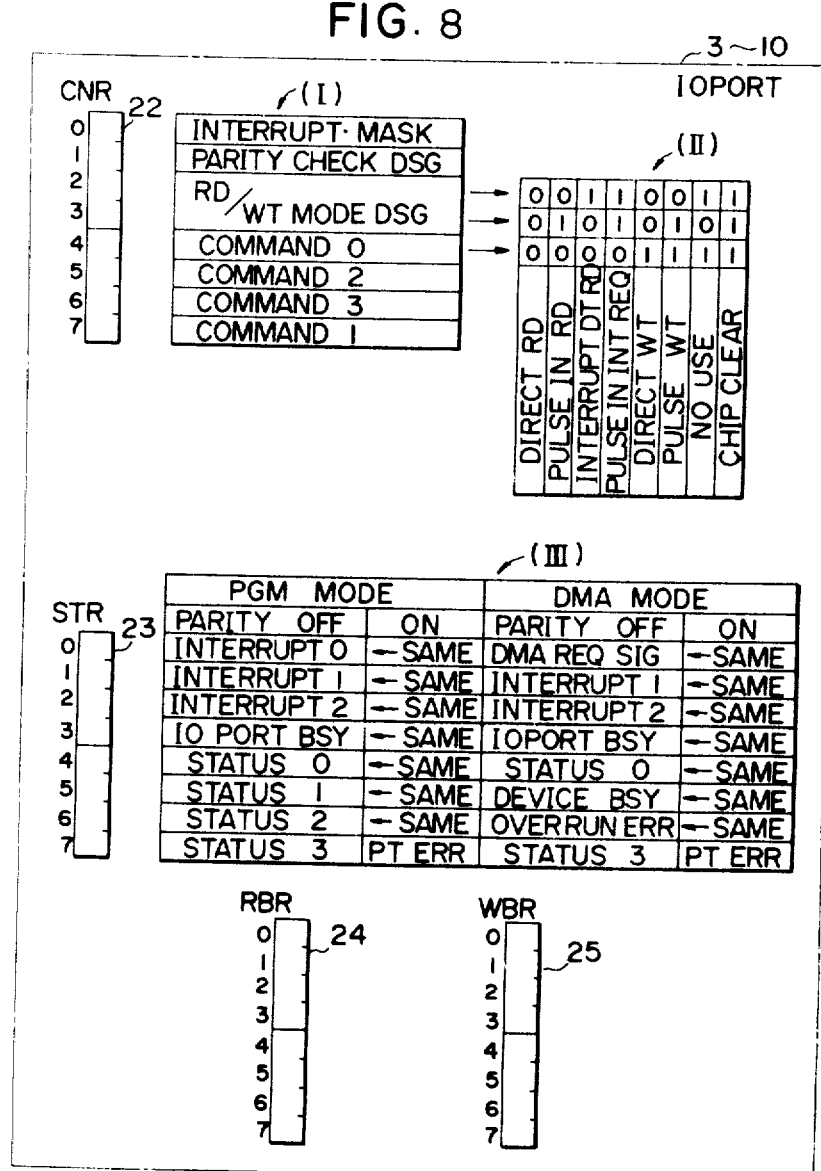
FIG. 8 is a diagram showing the outline of an input-/output control port.

FIG. 8 shows the outline of one example of the construction of the input/output control ports 3–10, while FIG. 9 is a diagrammatic representation of the input/output control ports (IOPORTS) 3–10. The input/output control ports 3 to 10 are each composed of at least a control register (CNR) 22, a status register (STR) 23, a read buffer register (RBR) 24, and a write buffer register (WBR) 25.

The functions of the abovesaid registers will hereinbelow be described.

(1) Control register (CNR) 22

The bit configuration of this register is shown in Table (I) in FIG. 8. A bit "INTERRUPT MASK" is an interrupt approval bit. When a logic "1" is given, an interrupt approval state is indicated and, when interrupt bits 0 to 2 of the status register 23 (described later) are set, an interruption request signal is sent to central processing unit 1 (FIG. 4). Conversely, if a logic "0" is given, an interrupt inhibit state is provided, and no interruption request signal is produced.

A bit "PARITY CHECK DSG (DESIGNATING)" is a bit for instructing the data bus as to whether or not a parity check bit is used. When a logic "1" is given, data becomes of "8 bit + 1 parity" and is handled as an odd parity.

A pair of bits "RD/WT MODE DSG (READ-/WRITE MODE DESIGNATING)" is used to instruct as to the manner of handling of data for its transfer. The designation as to whether the data transfer is for reading or for writing is given by a bit "COMMAND 0" described later. The pair of bits "RD/WT MODE DSG" designates various transfer modes in combination with the bit "COMMAND 0". This mode designation is shown in Table (II) in FIG. 8. Operations in the respective modes will be described later on.

The bit "COMMAND 0" determines the direction of the data bus (read or write) as described previously. In the case of a logic "0", the direction for reading (from the input/output device to the input/output control port) is designated and, in the case of a logic "1", the direction for writing (from the input/output control port to the input/output device) is designated.

Bits "COMMAND 2" and "COMMAND 3" are commands for the input/output devices and, for example, designate registers on the side of the input/output devices. A bit "COMMAND 1" is used for device start, and is set and reset by instructions. This bit is automatically reset when bits "INTERRUPT 1" and "INTERRUPT 2" of the status register (STR) 23 (described later) are produced. When a designated one of the channels is used in the DMA mode and the bit "COMMAND 1" has a logic "1", the abovesaid bit "INTERRUPT 0" is utilized as a DMA request signal (refer to Table III described later).

The above has, among other things, described the manner in which the data transfer mode is designated according to the patterns of the bits 2, 3 and 4 of the control register 22. This mode will now be further described with reference to Table II of FIG. 8.

(a) Direct read mode (DIRECT RD)

In this mode, data existing on the input side is, at the instant of generation of the read instruction, written in the data bus 13 (FIG. 4) in the so-called "effluent" manner.

(b) Pulse input read mode (PULSE IN RD)

This mode is designated in the case where input data is applied in the form of pulses. The rise of the input data is detected and set in the read buffer register, and then input at the time of generation of a read instruction. For resetting the read buffer register, a logic "1" is given to the bit desired to be reset, and a write instruction to the read buffer register is provided.

(c) Interrupt data read mode (INTERRUPT DTRD)

In this mode, when the interrupt request signal "INTERRUPT 0" is produced, input data is set in the read buffer register, and it is input at the time of generation of a subsequent read instruction. Where the next interrupt request signal "INTERRUPT 0" is applied before the subsequent read instruction is applied, the content of the abovesaid read buffer register is renewed, and a flag indicating an overrun error of the status register (STR) 23 (to be described later) is set in the register.

(d) Pulse input interruption request mode (PULSE IN INT REQ)

The operations in this mode are the same as those in the abovesaid pulse input read mode (b), but a signal produced by OR operations achieved in connection with all of the eight bits of the read buffer register is applied as an interruption request signal to the central processing unit 1 (FIG. 4). That is, in this mode, the read buffer register is employed as a register for an interruption source.

(e) Direct write mode (DIRECT WT)

In this mode, output data is directly coupled to the write buffer register; that is, when a write instruction is given, the data on the data bus 13 (FIG. 4) is set in the write buffer register and the output data also changes in the "effluent" manner correspondingly.

(f) Pulse write mode (PULSE WT)

The operation in this mode will be described later with reference to FIGS. 10 and 11 so as to explain the data sending and receiving control circuit for use in this invention.

(g) Chip clear mode (CHIP CLEAR)

In this mode, all flip-flops and registers in the chip are cleared. As a result of this, the bits 2, 3 and 4 of the control register (CNR) 22 are also set to "0".

(2) Status register (STR) 23

The relationship between bits in this status register 23 and external pins is shown in Table (III) in FIG. 8. The relationship differs depending upon whether a selected one of the channels is in the DMA mode or in the program mode, and depending on whether or not the data in the channel is provided with the parity bit.

A bit "INTERRUPT 0" is an interruption signal and, when it is set, an interruption request signal is applied to the central processing unit. Resetting of this bit is achieved by setting the bit 0 of the data bus to logic "1", and then applying a write instruction to the status register (STR) 23. In the case where the mode designated by the control register (CNR) 22 is the interrupt data read mode, the data is input by the bit "INTERRUPT 0" into the read buffer register.

A bit "INTERRUPT 1" is also provided as an interruption signal and, when it is set, an interruption request signal is applied to the central processing unit. Resetting of this bit is the same as with respect to the abovesaid bit "INTERRUPT 0". When the bit "INTERRUPT 1" is set, the bit "COMMAND 1" of the control register is reset.

A bit "INTERRUPT 2" is similarly provided as an interruption signal and, upon setting of this signal, an interruption request signal is applied to the central processing unit. Resetting of this bit is the same as with respect to the bit "INTERRUPT 0". When the input/output control port is used with the DMA control unit 11 (FIG. 4), a transfer completion signal derived from the unit 11 is applied to the bit "INTERRUPT 2". Upon setting of this bit, the bit "COMMAND 1" of the control register 22 is reset.

A bit "IO PORT BSY (BUSY)" has a logic "1", for example, during an OR operation between a control signal and a response signal thereto, as will be described later with regard to FIG. 10.

A bit "STATUS 0" is directly connected to an external pin to introduce an external status.

A bit "STATUS 1/DEVICE BSY" has a function which differs in the program mode and the DMA mode, respectively. In the case of the former, it is directly connected to an external pin so as to directly introduce an external status. In the case of the latter, it is a DMA busy flag, by which "COMMAND 1" of the control register is introduced.

A bit "STATUS 2/OVERRUN ERR (ERROR)" also differs in function in the program mode and DMA mode, respectively. In the former case, an external status from an external pin and an overrun error flag are subjected to an OR operation, by which the external status is introduced. In the latter case, only the overrun error flag exists. In the program mode, when the interrupt data read mode is designated by the control register but the next "INTERRUPT 0" is applied before execution of the read instruction, the overrun error flag is produced. In the DMA mode, it is generated when the next DMA request signal is applied before completion of the processing of the preceding DMA request.

A bit "STATUS 3/PT ERR" (PARITY ERROR)" is a bit whose meaning changes dependent upon whether or not parity exists. In the presence of parity, it is directly coupled with an external pin so as to directly introduce an external status. In the absence of parity, it becomes a parity flag. A parity check, in this case, is an odd parity check.

(3) Read buffer register (RBR) 24

This is a data input buffer register, through which data is input from the input/output device, and led to the data bus 13, in the mode designated by the control register (CNR) 22.

(4) Write buffer register (WBR) 25

This is a data output buffer register, through which data is led to the input/output device in the mode designated by the control register (CNR) 22. This register is also adapted to be used as a read buffer register.

Referring to FIG. 9, the IOPORT 3-10 will be further described in connection with FIG. 13 which shows the relationships between the above-described control register (CNR) 22 and the status register (STR) 23, respectively, vis-a-vis external pins.

The present invention employs general purpose input/output control ports which are adapted to be correctly actuable in various modes of operation, as described in the foregoing. However, there is one more technical problem to solve. Generally, in the data transfer between an input/output control port and an input/output device, a control signal is sent to the input/output device to guarantee the data transferred, but the pulse width of the control signal is required to change with the kind of the input/output device used, the distance to the input/output device, etc. It is difficult to make full functional use of the input/output control port described above if this problem is left unsettled.

In accordance with the invention, this problem is settled in the following manner. FIG. 10 is a detailed logic block diagram which describes one example of a circuit construction for the pulse write mode, while FIG. 11 is a timing chart related thereto. In FIG. 10, reference numeral 40 indicates a write buffer register, which can also be used as a read buffer register, if necessary; 41 designates a data sending and receiving control circuit according to this invention; 42 to 45 denote R-S flip-flops; 26 to 31 identify NAND circuits; 32 and 32a represent NOT circuits; 33 shows an OR circuit; 34 refers to a control signal (CNT SIG); and 35 indicates a response signal (RSPD SIG).

Figure 10:
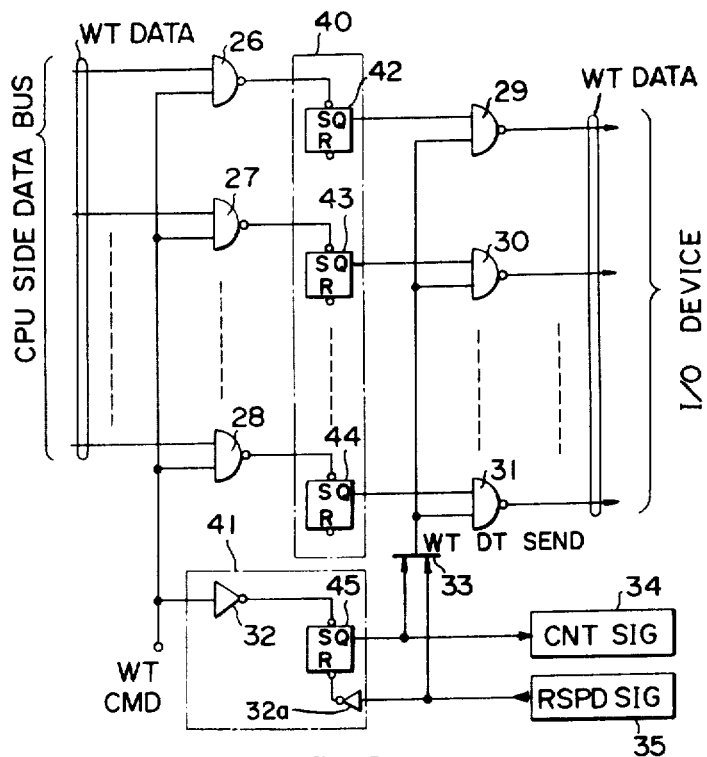
FIG. 10 is a diagram illustrating the construction of one example of a data write control part.

In FIG. 10, when a write instruction is applied in a pulse form on the WT CMD line, each bit information on the data bus WT DATA is set in the flip-flops 42 to 44 through the NAND circuits 26 to 28. At the same time, the WT CMD also sets the flip-flop 45 through the NOT circuit 32 and the control signal 34 produced by its output Q is applied to an input/output device. The output Q is also applied to the NAND circuits 29 to 31 through the OR circuit 33. The contents of the flip-flops 42 to 44 are thus applied as write data (WT DATA) to the input/output device.

Figure 11:
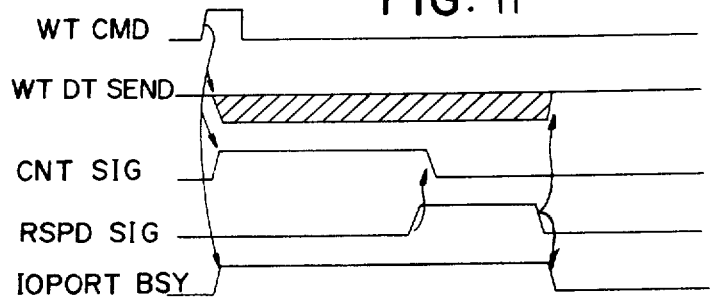
FIG. 11 is a timing diagram for explaining the operation of the data write control part of FIG. 10.
Figure 14:
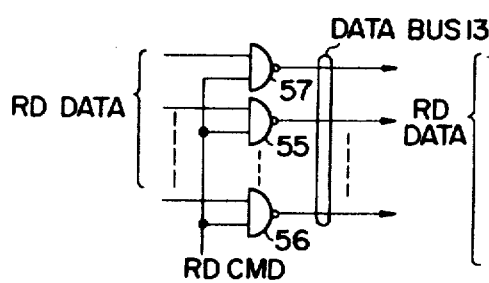
FIGS. 14 thru 18 are diagrams respectively showing the constructions of examples of data sending and receiving control circuits corresponding to data sending and receiving modes of the input/output control port.
Figure 15:
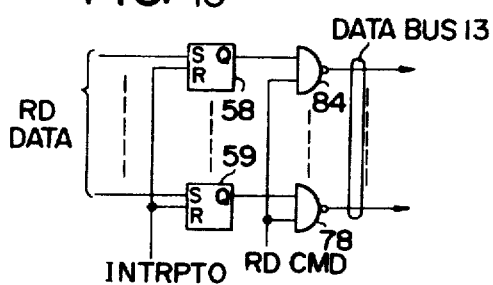
Figure 16:
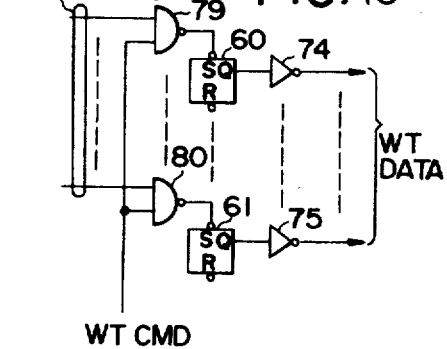
Figure 17:
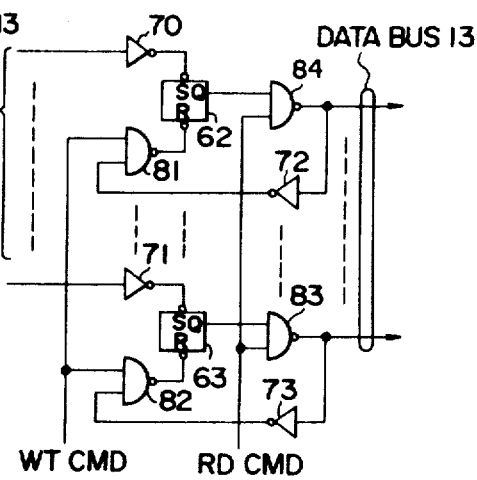
Figure 18:
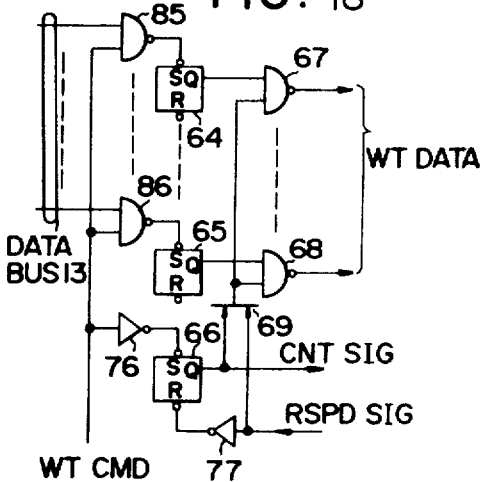

Referring to FIG. 11, the timing with which the write data is received at the input/output device varies with the kind of input/output device used and the distance thereto. Accordingly, the control signal is used for guaranteeing the data. In this invention, the timing for receiving the write data is determined by the input/output device, thereby ensuring universality of construction of the input/output control port. In FIG. 10, when the control signal 34 is produced and the write data is supplied as described above, the input/output device receives the control signal 34 to determine desired timing, and then generates the response signal 35. Upon reception of the response signal 35 on the side of the input/output control port, the flip-flop 45 is reset via NOT circuit 32a so as to "drop" the control signal 34. However, until the response signal 35 "drops," sending of the write data is maintained through the OR circuit 33 and, when the response signal "drops," sending of the write data is stopped. During sending of the write data, the bit "IOPORT BSY" is held to the logic "1" value.

The data sending and receiving control circuit 41 described above with regard to FIGS. 10 and 11 is not limited specifically to the pulse write mode but is employed in data transfer from the input/output control port.

As described above, according to this invention, the timing of generation of the control signal is selected on the side of the input/output device, so that universality of the input/output control port can be ensured regardless of the kind of input/output control port used and the distance thereto. This minimizes the number of kinds of IC chips of a microcomputer used, and greatly contributes to the reduction of manufacturing cost.

Next, a description will be given of a direct memory access control system which employs a one-chip direct memory access control unit for the management/control of direct memory access of channels, and which is designed to decrease the number of external pins of the chip used and to permit an identical construction of a plurality of input/output control ports respectively forming the abovesaid channels.

As schematically shown in FIG. 12, the DMA control unit 11 comprises memory address registers (MAR) 17, word count registers (WCR) 18, a sub-channel counter (SC) 20, and a DMA control part (DMA CNT) 21. The memory address registers 17 are each a register for storing address information for a memory during DMA control. They are each composed of, for example, 16 bits, are capable of designating up to 65K addresses, and are capable of designating one word (two bytes) of the memory 2 through the data bus 13 shown in FIG. 4.

The word count registers 18 correspond to what is termed a direct memory access instruction memory part in accordance with this invention, and one is provided for each of the channels CH0 to CH3 for designating the number of words or bytes transferred during the DMA control. These registers are composed of, for example, 16 bits: four upper bits are used for control instructions such as word/byte transfer designation, and the remaining twelve bits designate the number of words or bytes to be transferred. Of the illustrated mode designating parts of the word count registers 18, the read/write part designates a transfer direction relative to the memory 2 during the DMA control. The sub-channel counter operation designating part is for step management of the sub-channel counter 20. When the contents of all the sub-channel counter operation designating parts of the word count registers 18 corresponding to the channels CH0 to CH3 have a logic "0", the sub-channel counter 20 continues its step operation. For example, if the content of the operation designating part of the word count register 18 corresponding to the channel CH1 has a logic "1", the sub-channel counter 20 stops its step operation with its content held in the state "01". The word/byte designating part is to designate either word or byte transfer. This is due to the presence of a channel effecting the word transfer, such as the channel CH3 shown in FIG. 4, and channels effecting the byte transfer, such as the channels CH0 to CH2. The "MAR 17" part is to designate either of an upper or lower byte of one word designated by the content of the memory address register 17 in the byte transfer. In the case of DMA control by the byte transfer, this bit is transmitted to the memory 2 and the bus switching unit 12 of FIG. 4 through signal lines in such a manner as to be added to the least significant bit. Needless to say, the content of the bit "MAR 17" is increased by 1 at every transfer of one byte and, in the case of byte transfer, after every other transfer, the least significant bit of the memory address register 17 is increased by 1. The 12 bits of the word/byte number designating part are to designate the number of words in the word transfer or the number of bytes in the byte transfer, and are capable of designating up to 4K words.

or 4K bytes at a maximum at one time. At every transfer of one word or one byte, the value 1 is subtracted from the content of the word/byte number designating part and, when its content is "all zero," completion of the transfer by the DMA control is indicated.

The sub-channel counter (SC) 20 is formed with a binary counter. Since the channels managed by the DMA control unit 11 are four in the illustrated case, i.e., the channels CH0 to CH3, the counter 20 runs free step-by-step so that bits SC0 and SC1 successively assume values of "00", "01", "10", "11", "00" .... For example, in the case of "00", the IOPORT #0 (CH0) is indicated (FIGS. 1 and 4). The contents of the SC 20 are supplied to the multiplexer 15 and the decoder 16. In FIGS. 1 and 4, if a DMA request signal DRQ 0 from the channel CH0 is supplied to the multiplexer 15, this request signal is applied as DRQ to the DMA control unit 11. When supplied by the unit 11 with a DMA operation approval signal DOP, the decoder 16 selects the channel CH0 and applies the signal thereto as an approval signal DOP0. As a result of this, the channel CH0 enters its DMA service under the control of the DMA control unit 11.

Upon completion of the DMA service of the channel CH0, the content of the sub-channel counter 20 is caused to step successively to "01", "10", "11", "00", ... Of course, while the content of the sub-channel counter 20 is renewed and the channels CH0 to CH3 are scanned, if any one of the channels produces a DMA request signal, this request is supplied to the DMA control unit 11 through the multiplexer 15 in accordance with the content of the sub-channel counter 20.

Where the DMA control unit 11 passes control to the plurality of channels CH0 to CH3 (as described above), the DMA control unit 11 usually requires at least two pins for the signals DRQ and DOP, respectively, to serve each channel. In the case of this invention, however, it is sufficient to provide only log₂ m pins for taking out the contents of an m-step sub-channel counter, and pins for the signals DRQ and DOP, in common to the channels. Namely, in the case of forming the DMA control unit 11 with one chip, the number of external pins is limited and the question of how to decrease this number is usually a very serious problem. However, in accordance with this invention, the number of external pins used can be greatly reduced.

Next, referring back to FIG. 9, a description will be given of a one-chip input/output control port 3-10 which employs a control register 22, status register 23, and a data sending and receiving control circuit 90 for a plurality of modes, so that the input/output control port 3-10 is applicable to the various modes of the data sending and receiving operation so as to ensure its universality of application.

FIG. 13 shows the relationships of the abovesaid control register (CNR) 22 and the status register (STR) 23 to external pins via control circuit 90. FIGS. 14 to 18 illustrate control circuit constructions respectively corresponding to various modes of the data sending and receiving operation.

In FIGS. 13 to 18, reference numeral 13 corresponds to the data bus shown in FIG. 4, and reference numerals 22 and 23, respectively, correspond to the registers in FIGS. 8 and 9. Reference numeral 19 indicates external pins; 51 and 52 designate differentiation circuits; 36 to 39, 49 and 50 denote AND circuits; 46 to 48 represent OR circuits; 53 and 54 identify NOT circuits; 58 to 66 show R-S flip-flops; 70 to 77 refer to NOT circuits; and 55 to 57, 67, 68 and 78 to 86 indicate NAND circuits.

The operation of the arrangements of FIGS. 13 through 18 are considered obvious to one of ordinary skill in the art, especially after a reading of the previous description, in the specification, of the operation of the IOPORT's 3-10, and most especially after a reading of the description associated with FIG. 8 of the drawings. Accordingly, a further detailed description of the operation of FIGS. 13 through 18 is deemed to be unnecessary at this juncture.

In the present invention, as described with regard to FIG. 8, each input/output control port is provided with a control register 22 and a status register 23, and is adapted to be capable of designating any one of various modes of data sending and receiving operations in accordance with the content of the control register 22, and is further adapted to employ a data sending and receiving control circuit chosen from those shown in FIGS. 14–18, and actuable in various modes. Accordingly, the input/output control port is correctly actuable in any mode of data sending and receiving operation. That is, the input/output control ports forming the data processing system can be formed with IC chips of one kind, so that the overall cost of the data processing system can be reduced.

It will be apparent that many modifications and variations may be effected without departing from the scope of the novel concepts of this invention, and it is to be understood that the present invention encompasses the claimed invention, in accordance with the subsequent claims, and all equivalent embodiments thereof.

We claim:

1. A direct memory access control system comprising at least a central processing unit, a plurality of input/output control ports, and a memory, said central processing unit and said plurality of input/output control ports being connected to a data bus, said plurality of input/output control ports being directly accessible to said memory, said memory being capable of storing and providing data in a selectively designated one of several predetermined formats including word unit transfer and byte unit transfer, said word unit comprising upper byte information and lower byte information, said system further comprising a direct memory access control unit for supplying a word/byte designating signal and a signal designating a byte position at the time of byte designation, and a bus switching unit connecting said memory to said data bus, and connected to said direct memory access control unit for receiving therefrom said word/byte designating signal and said signal designating a byte position, and responsive thereto for controlling direct access to said memory by alternately providing said upper byte information and said lower byte information in said word unit when said byte unit transfer is selectively designated, and by providing said upper byte information and said lower byte information when said word unit transfer is selectively designated.

2. The system according to claim 1, wherein said plurality of input/output control ports comprises identically constructed semiconductor chips having respectively connected thereto corresponding input/output devices; said plurality of input/output control ports each further including a data sending and receiving control signal circuit for sending a control signal to a selected one of said corresponding input/output devices and for receiving a response signal therefrom to reset said control signal in the data sending and receiving between said selected one of said input/output devices and corresponding said input/output control port, whereby said data sending and receiving are achieved between said selected one of said input/output devices and corresponding said input/output control port in synchronism with each other.

3. The system according to claim 2, wherein said plurality of input/output control ports each includes a data buffer register for transferring data in either direction between corresponding said input/output devices and said data bus, a control register for designating at least a mode of said data transfer by said buffer register, a status register for designating to the central processing unit the status of said input/output control ports and of each of said respective input/output devices controlled thereby, and a plurality of modes of control circuits respectively corresponding to a plurality of modes of operation for data sending and receiving with respect to said data buffer register, said system being responsive to said mode designated by said control register for actuating a corresponding designated one of said plurality of modes of control circuits in accordance with the content of said control register.

4. A direct memory access control system comprising at least a central processing unit, a plurality of input/output control ports, and a memory, said central processing unit and said plurality of input/output control ports being connected to a data bus, said plurality of input/output control ports being directly accessible to said memory, said memory being capable of storing and providing data in a selectively designated one of several predetermined formats including word unit transfer and byte unit transfer, said word unit comprising upper byte information and lower byte information, said system further comprising a direct memory access control unit for supplying a word/byte designating signal and a signal designating a byte position at the time of byte designation, and a bus switching unit connecting said memory to said data bus, and connected to said direct memory access control unit for receiving therefrom said word/byte designating signal and said signal designating a byte position, and responsive thereto for controlling direct access to said memory by alternately providing said upper byte information and said lower byte information in said word unit when said byte unit transfer is selectively designated, and by providing said upper byte information and said lower byte information when said word unit transfer is selectively designated, said direct memory access control unit comprising a one-chip direct memory access control unit having at least one external pin, an m-step counter having a counter output indicating a selected one of said input/output control ports selected for access, and a direct memory access instruction memory for controlling the step operation of said m-step counter, the content of said m-step counter being derived at one of said at least one external pin; each of said plurality of input/output control ports comprising means for generating a corresponding direct memory access control request; said system further including means for scanning each said direct memory access control request in accordance with the output from said m-step counter, means responsive to said direct memory access control request for transferring a predetermined number of bytes consecutively, and means responsive to said direct memory access instruction memory for controllably stopping the step operation of said m-step counter, thereby continuously affecting the direct memory access control in connection with the same channel.

5. In a data processing system including at least a central processing unit and a memory connected to a common data bus, said memory being capable of storing and providing data in any one of several predetermined formats; a direct memory access control system for controlling direct access between said memory and a plurality of input/output devices, said direct memory access control system comprising, in combination:

a plurality of input/output control means, each connecting a respective input/output device to said common data bus, for controlling a data transfer in either direction between said respective input/output device and said memory;

direct memory access control means connected to said common data bus for receiving an access request signal from any of said plurality of input/output control means, and connected to said memory for providing thereto, in response to said access request signal, instructions at least as to the size and desired format of said data transfer; and bus switching means connecting said common data bus to said memory, and connected to said direct memory access control means for receiving said instructions, and responsive thereto for interfacing said memory to said common data bus in such a manner as to cause said data transfer to be of said desired format.

6. In the data processing system of claim 5, wherein said direct memory access control system includes subchannel counter means for successively designating consecutive ones of said plurality of input/output control means from which said access request signal may be received by said direct memory access control means.

7. In the data processing system of claim 5, wherein said direct memory access control system includes memory address register means, one for each input/output control means, for designating a corresponding location in said memory from which or to which said data transfer is to be made by said input/output control means.

8. In the data processing system of claim 5, wherein said direct memory access control system includes word counter register means, one for each input/output control means, for initially holding a corresponding data word indicating the size of said data transfer from or to said input/output control means.

9. In the data processing system of claim 8, wherein said word counter register means is a down-counter for indicating when said data transfer is completed.

10. In the data processing system of claim 8, wherein said word count register means has a read/write portion designating the direction of said data transfer.

11. In the data processing system of claim 8, wherein said word count register means has a word/byte portion designating the format of said data transfer.

12. In the data processing system of claim 11, wherein said word count register means has a further portion designating, in the case of a two bytes-per-word format, which of said two bytes is to be transferred.

13. In the data processing system of claim 5, including multiplexer means connected between each of said input/output control means and said direct memory access control means for extracting said access request signals from said input/output control means, and for selectively passing said access request signals, in timesequenced fashion, to said direct memory access control means.

14. In the data processing system of claim 13, wherein said direct memory access control means generates access approval signals indicating said input/output control means for which said access request signals have been approved, and including further means connected between each of said input/output control means and said direct memory access control means for receiving said access approval signals from said direct memory access control means, and for selectively passing said access approval signals to said input/output control means.

15. In the data processing system of claim 14, wherein said further means is a decoder means for decoding said access approval signals whereby to determine the input/output control means for which it is intended.

16. In the data processing system of claim 5, wherein said input/output control means includes buffer register means for transferring data in either direction between corresponding said input/output devices and said common data bus, and control register means for designating at least the mode of said data transfer by said buffer register means.

17. In the data processing system of claim 5, wherein said input/output control means includes status register means for designating to said central processing unit the status of said input/output control means and of each of said respective input/output devices controlled thereby.

18. In the data processing system of claim 5, wherein said input/output control means includes read buffer register means for holding data being transferred from said respective input/output device to said common data bus, and control circuit means for generating a first signal indicating that data has been received from said input/output device, and for receiving a response signal from said direct memory access control means, said control circuit means being responsive to said response signal for passing said data from said read buffer register means to said common data bus.

19. In the data processing system of claim 18, wherein said read buffer register means is a plurality of flip-flop devices connected in parallel.

20. In the data processing system of claim 5, wherein said input/output control means includes write buffer register means for designating at least the mode of said data transfer from said common data bus to said respective input/output device, and control circuit means for generating a first signal indicating that data has been received from said common data bus, and for receiving a response signal from said input/output device, said control circuit means being responsive to said response signal for passing said data to said input/output device.

21. In the data processing system of claim 20, wherein said write buffer register means is a plurality of flip-flop devices connected in parallel.

* * * * *

UNITED STATES PATENT AND TRADEMARK OFFICE
CERTIFICATE OF CORRECTION

PATENT NO. : 4,271,466

DATED : June 2, 1981

INVENTOR(S) : MITSURU YAMAMOTO ET AL.

It is certified that error appears in the above—identified patent and that said Letters Patent is hereby corrected as shown below:

```
Front Page, [73] Assignee, after "Limited" insert
          --, Kawasaki, Japan--;
Front Page, [63], "Feb. 10" should be --Feb. 18--.
Col. 3, line 40, "#31" should be --#3ℓ--;
        line 43, "#51" should be --#5ℓ--;
        line 51, "u" should be --ū--;
        lines 51 and 55, "1" should be --ℓ--.
Col. 5, line 51, "1" should be --ℓ--;
        lines 59 and 63, "1" should be --ℓ--.
Col. 6, line 36, "#31" should be --#3ℓ--;
        line 39, "#51" should be --#5ℓ--;
        line 46, "u and 1" should be --ū and ℓ--;
        line 61, "1" should be --ℓ--;
        line 65, after "operations" insert --,--.
Col. 7, lines 6 (both occurrences), 21, 26, 34, 42 and 43,
        "1" should be --ℓ--.
Col. 8, lines 42 and 54, "Q" should be --Q̄--.
```

Signed and Sealed this

Thirteenth Day of October 1981

[SEAL]

Attest:

GERALD J. MOSSINGHOFF

*Attesting Officer*  *Commissioner of Patents and Trademarks*